(12) United States Patent
Ward et al.

(10) Patent No.: US 7,449,033 B2
(45) Date of Patent: Nov. 11, 2008

(54) EXTRUDED BATTERY COMPONENTS AND MANUFACTURING PROCESS

(75) Inventors: Ian M Ward, Leeds (GB); Hugh V S Hubbard, Leeds (GB); Paul L Carr, Harrogate (GB); William F Tyldesley, Cambridge (GB)

(73) Assignee: Leeds Lithium Power Limited, Leeds (GB)

( * ) Notice: Subject to any disclaimer, the term of this patent is extended or adjusted under 35 U.S.C. 154(b) by 657 days.

(21) Appl. No.: 10/472,226

(22) PCT Filed: Aug. 31, 2001

(86) PCT No.: PCT/GB01/03937

§ 371 (c)(1),
(2), (4) Date: Sep. 22, 2003

(87) PCT Pub. No.: WO02/19450

PCT Pub. Date: Mar. 7, 2002

(65) Prior Publication Data

US 2004/0123450 A1     Jul. 1, 2004

(30) Foreign Application Priority Data

Sep. 1, 2000   (GB) ................................ 0021466.8

(51) Int. Cl.
   *H01M 10/04* (2006.01)
(52) U.S. Cl. .................... 29/623.3; 29/623.1; 29/623.2; 29/623.4; 29/623.5; 29/730; 429/162; 429/303
(58) Field of Classification Search .................... None
   See application file for complete search history.

(56) References Cited

U.S. PATENT DOCUMENTS

| 2,973,398 | A | * | 2/1961 | Hubbard et al. ............ 429/146 |
| 4,172,319 | A | * | 10/1979 | Bloom et al. ............ 29/623.4 |
| 5,296,318 | A | | 3/1994 | Gozdz et al. |
| 5,455,999 | A | * | 10/1995 | Weiss et al. ................ 29/623.1 |
| 5,470,357 | A | * | 11/1995 | Schmutz et al. ............ 29/623.5 |
| 5,486,104 | A | * | 1/1996 | Cowley ...................... 425/142 |
| 5,639,574 | A | * | 6/1997 | Hubbard et al. ............ 429/303 |
| 5,688,293 | A | * | 11/1997 | Oliver et al. ................ 29/623.1 |
| 6,019,803 | A | * | 2/2000 | Oskam et al. ............ 29/623.5 |
| 6,372,380 | B1 | * | 4/2002 | Kitami et al. ................ 429/161 |
| 2001/0037557 | A1 | * | 11/2001 | Yoshida et al. ............. 29/623.4 |

FOREIGN PATENT DOCUMENTS

| EP | 0 497 633 A | | 8/1992 |
| EP | 0 651 455 A | | 5/1995 |
| JP | 11-204139 | * | 7/1999 |
| WO | WO 99/40644 | * | 8/1999 |

* cited by examiner

*Primary Examiner*—Jonathan Crepeau
*Assistant Examiner*—Tony Chuo
(74) *Attorney, Agent, or Firm*—Nixon & Vanderhye P.C.

(57) ABSTRACT

The invention provides an apparatus and method for producing multilayer laminates of polymeric electrolyte material incorporating one of more electrode layers. The apparatus (40) comprises an extrusion apparatus (42) for extruding a polymeric material (76) and a pair of heated rollers (46, 48) between which the material (76) and electrodes (60, 68, 72) are pressed in order to produce a continuous extrudate (80). The method may also include producing a gellable mixture comprising a crystallisable polymer and an aprotic organic liquid, forming the mixture as an elongate tape and contacting the tape with an electrode material. A compression and heating step may be present.

36 Claims, 5 Drawing Sheets

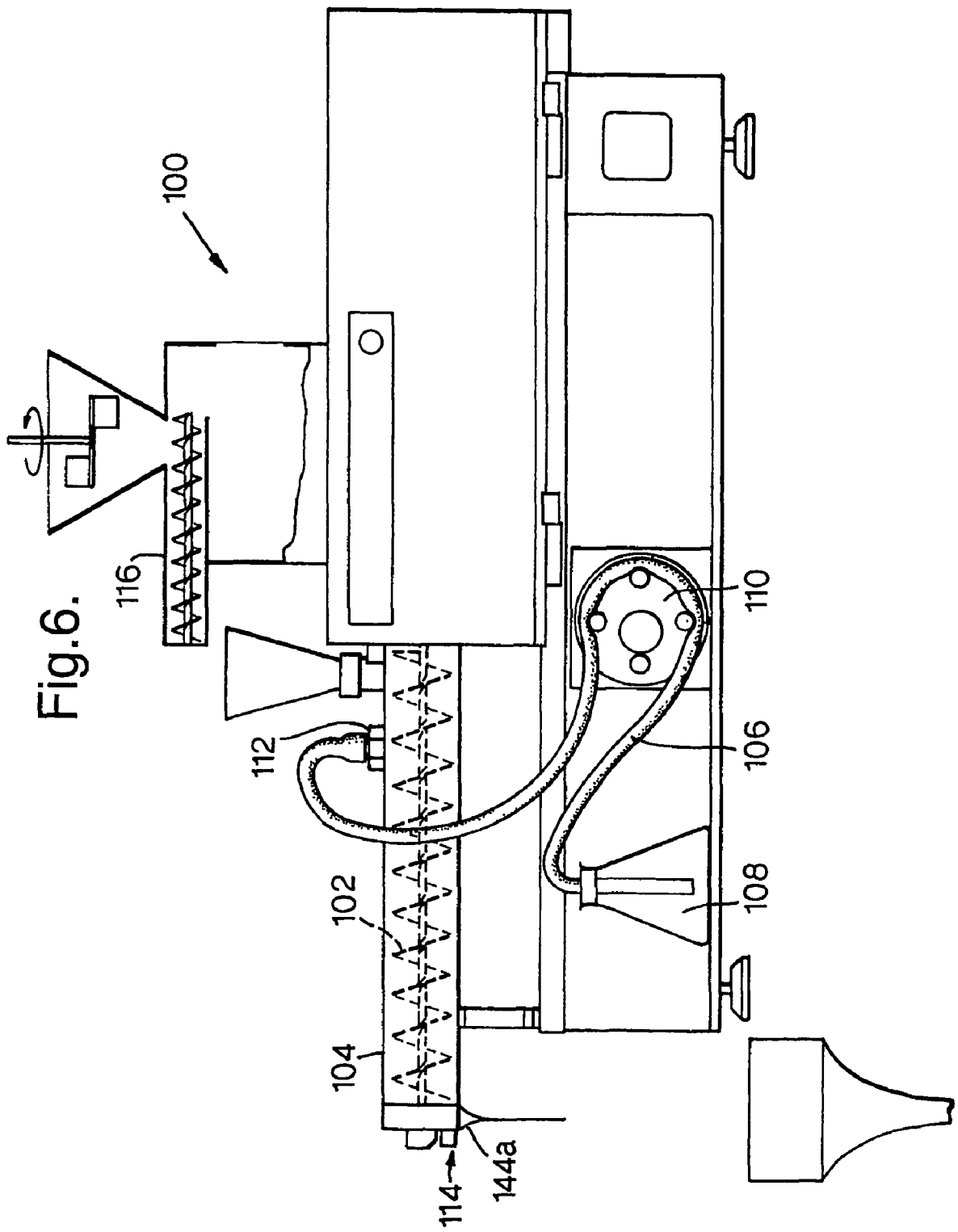

EXTRUDED BATTERY COMPONENTS AND MANUFACTURING PROCESS

This application is the U.S. National Phase of International application PCT/GB01/03937, filed 31 Aug. 2001, which designated the U.S.

The present invention relates to laminates of polymeric electrolyte material incorporating one or more electrode layers and to methods of continuously extruding such laminates. It relates particularly to laminates of polymeric gel electrolyte material.

Traditional aqueous liquid electrolyte galvanic cells have a disadvantage in so far as the electrolytes are corrosive, they do not provide a firm barrier between the electrodes when required to assist in stabilising the inter-electrode distance and, accordingly, they do not prevent physical loss of electrode material from the electrode surface.

In order to overcome disadvantages inherent in the field of liquid electrolytes considerable research has been carried out in the filed of solid or highly viscous polymeric electrolytes which contain salts which display mobility, under appropriate conditions, of at least some of the ionic species present.

Solid polymeric electrolytes are capable of acting in thin film form as electrode separators and in solid-state cells can deform while maintaining good contact with the electrodes, thus minimising problems arising from mechanical strain arising either from mechanical stresses during use or volume changes within the charge/discharge cycle. A particular area of importance is in cells that do not depend upon water as a component of the electrolyte, such as lithium cells where water and other materials capable of reacting with lithium are undesirable. The potential uses for such materials are not limited to batteries but include, inter alia, sensor devices and thermoelectric energy convectors.

U.S. Pat. Nos. 5,460,903 and 5,639,574 (both incorporated herein by reference) relate to polymeric electrolytes having improved properties with regard to a combination of conductivity and dynamic modulus. Particularly these teach ionically conductive, ion-containing gels having a bulk ionic conductivity at 20° C. and 10 kHz greater than $10^{-4}$ Siemens per centimetre and a dynamic modulus at 10 Hz greater than $10^3$ Pa, preferably greater than $10^5$ Pa, wherein the gel consists of a minor amount of a crystallisable polymer, a major amount of an organic compound that is a solvent for a salt at 20° C. but is not a solvent for the crystallisable polymer at 20° C., and a salt dissolved in the organic compound at a concentration greater than 4% by mass based on the organic compound. The said minor amount is preferably from 20% to 50% by mass, preferably up to 40%. The preferred polymers disclosed are halo-substituted polyolefins, most preferably being polyvinylidenefluoride (PVdF).

This material has a modulus sufficient to allow it to be employed between electrodes of the process herein described whilst providing sufficient resistance to prevent the electrodes coming into contact with each other should the battery components be mishandled. It will, however, be appreciated by those skilled in the art that an alternative dynamic modulus may be suitable, particularly if other means of preventing the confronting electrodes contacting each other can be employed. Suitable means for preventing contact are disclosed later herein.

Multilayer composite materials including polymeric electrolytes have been reported in U.S. Pat. Nos. 5,925,483, 5,597,658 and 5,705,084, 5,378,558 and 5,006,431 (all incorporated herein by reference). Methods for producing these laminates involve dip coating metallic electrode materials in high solvent content gels or extruding such high solvent liquid mixtures onto the electrodes, in both cases the solvent content being reduced by evaporation over a period of time. Such methods are not suited to rapid large scale continuous production of composite electrode/electrolyte.

The present invention now provides a method for producing electrical components including polymeric electrolyte materials and electrodes which is capable of operating at high speed while producing a high conductivity yet high modulus product. Such electrodes are conveniently metallic foils that are coated with active electrode materials such as graphite based coatings for anodes and lithium metal oxide intercalation compound based coatings for cathodes.

Thus in a first method of a first aspect the present invention provides a method of producing a laminated electrical component incorporating a polymeric electrolyte layer and an electrode material layer characterised in that it comprises steps of (i) producing a gellable mixture comprising a crystallisable polymer and an aprotic organic liquid, the liquid not being a solvent for said polymer at a first temperature but being a solvent for said polymer at some higher temperature, the ratio of the mass of the polymer to the mass of the liquid being from 1:4 to 2:3 and the mixture having a having a bulk ionic conductivity at said first temperature and 10 kHz greater than 104 Siemens per centimetre and a dynamic modulus at said first temperature and 10 Hz greater than $10^4$ Pa.

(ii) forming the mixture as an elongate tape of desired width and depth (iii) contacting the tape from step (ii) with an electrode material at a temperature at which the tape, at least at the contact surface, is in the liquid phase (iv) simultaneously or sequentially with step (iii) compressing the electrode material and mixture whereby an elongated laminated composite is formed.

A preferred method of the first aspect provides a method of producing a laminated electrical component incorporating a polymeric electrolyte layer and an electrode material layer characterised in that it comprises steps of:

(i) producing a gellable mixture comprising a crystallisable polymer and an aprotic organic liquid, the liquid not being a solvent for said polymer at a first temperature but being a solvent for said polymer at some higher temperature, the ratio of the mass of the polymer to the mass of the liquid being from 1:4 to 2:3 and the mixture having a having a bulk ionic conductivity at said first temperature and 10 kHz greater than $10^{-4}$ Siemens per centimetre and a dynamic modulus at said first temperature and 10 Hz greater than $10^4$ Pa;

(ii) extruding the mixture through an orifice of defined shape and dimension at a temperature at which it is in the form of a homogenous liquid phase;

(iii) contacting the extruded mixture in the liquid phase with an electrode material layer to produce a laminated composite comprising electrode and mixture layers;

(iv) compressing the laminated composite formed in (iii) while the mixture is still in the liquid phase whereby an elongate laminated composite of defined thickness is produced; and (v) causing the laminate to cool such that the mixture is converted to a solid gel.

A second preferred method of the first aspect of the invention provides a method of producing a laminated electrical component incorporating a polymeric electrolyte layer and an electrode material layer characterised in that it comprises steps of:

(i) producing a polymeric electrolyte gel comprising a crystallisable polymer and an aprotic organic liquid, the liquid not being a solvent for said polymer at said first temperature but being a solvent for said polymer at some higher temperature, the ratio of the mass of the polymer to the mass of the liquid being from 1:4 to 2:3 and the mixture having a having a bulk ionic conductivity at said first temperature and 10 kHz greater than $10^{-4}$ Siemens per centimetre and a dynamic modulus at said first temperature and 10 Hz greater than $10^4$ Pa;

(ii) forming the gel as an elongate tape of desired width and depth;

(iii) compressing the gel tape together with an electrode material while heating the tape, the tape and electrode material being contacted such that at least at the point of contact with the electrode material the tape is in the liquid phase whereby an elongate laminated composite is formed; and (iv) causing the laminate so formed to cool such that the liquid phase is converted back into the gel phase.

Advantageously, said first temperature is between 10 and 30° C., preferably between 15 and 25° C. and particularly preferably substantially 20° C.

Preferably, the compressing step of the above first aspects of the present invention comprises passing the electrode material and mixture through a nip formed between two or more rollers.

For all of the aforesaid methods it is most preferred that, prior to contact of the mixture, whether in liquid or gel form, with the electrode material, an aprotic organic liquid is applied to one or more of the surfaces to be contacted. It is more preferred that the aprotic organic liquid be applied to the mixture just prior entering the nip but it may be applied to the electrode surface also with advantage.

The aprotic organic liquid is preferably that which is used to make the mixture, but may comprise any one of the component liquids used in that mixture or may be a further aprotic organic liquid such as is conventionally found in aprotic liquid electrolytes commonly used in lithium ion electrolyte system cells, but is preferably of monovalent type, such as —$BF_4$, —$PF_6$, —$AsF_6$, —$CF_3SO_3$, $LiN(CF_3SO_2)_2$, $LiN(CF_3CF_2SO_2)_2$, $LiC(CF_3SO_2)_3$, —$CF_3COO$, SCN, —$ClO_4$, —$HgI_3$. Some of these may be too volatile for inclusion in the extrusion process due to the temperature at which the mixture is rendered liquid. Such volatile solvents include but are not limited to diethylcarbonate, 1,3-dioxolane, dimethylcarbonate, 1,2-dimethoxyetholane, dimethoxymethane, 1,3-dimethoxypropane, ethylmethyl carbonate, 1,2 diethoxyethane, dichloromethane and dichloroethane. Such organic liquids may conveniently be added into the product at any stage after the step at which the electrolyte is initially extruded.

Where any of the aforesaid liquids are added at the point of contact of the electrolyte and the electrode they may conveniently be supplied at a rate from 0.01 to 1 times that of the electrolyte on a weight per weight basis, more conveniently being at 0.1 to 0.5 times weight by weight and still more preferably at from 0.2 to 0.3 times the weight. For example, where the rate of throughput of electrolyte component is greater than 0.5 m/minute and preferably about 1 m/minute. It will be realised by those skilled in the art that only a proportion of the liquid added is incorporated into the final product. The major benefit of adding liquid at this point is that it significantly reduces the amount of gas, particularly air, tapped between the electrode material and the polymeric electrolyte, and thus also improves adhesion between layers and leads to a much more compact laminate product.

In a continuous process using, for example, a twin-screw extruder etc. the highly hygroscopic part of the process could then be conducted in the narrow space between extrudate and lamination between rollers (in the nip) enabling better control over dryness and allowing the feed end of the twin-screw extruder to be operated under less stringently dry conditions. A high salt-solvent concentrate could also be added in this space and could provide the salting phase for the component. This same method can be used to introduce the salt into the polymer gel electrolyte via a concentrated solution of solvent and salt. This is particularly advantageous for the tetraethyleneglycol dimethylether (tetraglyme) system where gels of this composition can degrade during heating of the melt.

It will be appreciated that the solvent/salt addition may be made at a number of points and may take the form of a number of elements. For example, additions can be at one or more of: along the barrel of the screw extruder; direct injection into the extruder die; by pre-wetting the electrodes and at the entry to the "nip" between the rollers subsequent to lamination. The addition may comprise: gel solvent; volatile solvent; salt solution or a mixture of solvents and salts, each of which is added at any one of the appropriate points.

Preferably the crystallisable polymer is selected from those described in the aforesaid patents U.S. Pat. Nos. 5,460,903, 5,639,574 and re-issue patent related thereto (incorporated herein by reference), but most preferably is a crystallisable polyhalo-olefin or copolymer thereof, more preferably being polyvinylidene fluoride (PVdF).

Preferably the aprotic liquid used to prepare the electrolyte mixture comprises one or more organic compounds as described in the aforesaid US patents, but most preferably comprises one or more of ethylene carbonate, propylene carbonate and tetraglyme. Other suitable high boiling point aprotic solvents include NMP, GBL, (N-Methyl-2-Pyrrolidone, Gamma Butyrylactone).

Preferably the mixture further includes one or more alkali or alkaline earth metal salts, more preferably an alkali metal salt and most advantageously a lithium salt. The salt may be of any anion that is commonly used in polymeric electrolyte system cells, but is most preferably of monovalent type, such as —$BF_4$, —$PF_6$, —$AsF_6$, —$CF_3SO_3$, $LiN(CF_3SO_2)_2$, $LiN(CF_3CF_2SO_2)_2$, $LiC(CF_3SO_2)_3$, —$CF_3COO$, SCN, —$ClO_4$, —$HgI_3$. This is preferably present at a concentration of 2% by mass or more based upon the weight of the organic aprotic liquid, more preferably at 4% by mass or more, preferably being up to its saturation concentration in any given mixture, but typically being up to 20% by mass, more typically up to 15% by mass.

Preferably the mixture is formed as a solid gel on cooling of the extruded material, that gel having a bulk ionic conductivity and a dynamic modulus at 20° C. as described in (i) above.

Preferably the mixture is degassed, more preferably as a gel, prior to contact with the electrode material and more preferably prior to extrusion.

Advantageously the electrode incorporates metal foil or open mesh gauze, typically a metal foil, typically 5 to 50 μm thick, more preferably 10 to 25 μm thick. The foil is preferably loaded with active electrode material such as is known to those in the art. The anode may conveniently be a copper foil loaded with carbonatious material such as graphite. The cathode may conveniently be an aluminium foil loaded with a lithiated manganese oxide material or may be based upon lithiated cobaltous oxide or lithiated nickel oxide or appropriate transition metal oxide. Many other such active materials will occur to those skilled in the art.

Where the component is to incorporate both an anode and a cathode these will most preferably be based upon metallic foils. These foils may conveniently be of less width than the polymeric electrolyte layer such as to ensure separation by the gel. Alternatively, when the final component is to be trimmed at its edges before use, the foils may extend beyond the gel material after lamination such as to 'seal' the electrolyte layer and thus protect the gel against ingress of water vapour. It may also be preferred to have one foil of width smaller than the other to avoid contact in the final product. Suitable foil electrode materials will occur to those skilled in the art.

It will be realised by those skilled in the art that if the salt is not included in the mixture before it is extruded then, in order to function as an electrolyte, a salt must be added to the resultant gel or gelling mixture after extrusion. It is preferred in such case to add the salt to the mixture by a process which contacts the composite produced from step (iii) or (iv) with an aprotic solvent solution including the said salt or salts. This is may be carried out by a process such as solvent exchange whereby the extruded gel/electrode composite is contacted with a compatible solvent, preferably being that of the gel, which contains the salt which is desired to be added to the composite.

Preferably the polymeric electrolyte mixture is prepared prior to use and produced in particulate gelled form suitable for loading into an extrusion apparatus, eg. a ram extruder. Such particulate form may be elongate pellets, eg. similar to candles in shape, and typically will be of 1 to 50 g each, eg. 5 to 20 g. Such gel may be formed by premixing components in a dry environment, eg. dry box, heating this to form a homogeneous melt, cooling the melt to form a gel while degassing under reduced pressure, eg. an appropriate degree of vacuum to remove gas in the appropriate time period, and then shaping the gel into pellets sized according to the size of the extrusion apparatus to be used such that ease of loading is ensured.

In order to extrude the polymeric gel the preformed particulate or pelletted gel may be loaded into the barrel of a ram extruder, the barrel heated to the melt temperature of the gel and the extrusion effected first, by advancing the extruder piston to void gases, then advancing it further at a desired controlled rate such that the gel extrudes, through the extruder die. The die orifice is of desired shape and dimension, eg. a slot die, to produce a strip of electrolyte having a desired profile which, after compression in the nip, is of appropriate component shape and dimension. For most purposes this is conveniently a continuous strip of set width and depth which can be rolled such as in U.S. Pat. No. 5,597,658 or otherwise sectioned.

In an alternative method the components may be mixed and heated in a mixer device associated with the extruder such as to directly feed the extruder barrel. The extruder may preferably then be a screw extruder, eg. twin screw extruder, the barrel of which is heated.

The die slot is preferably maintained at a temperature which is lower than that of the barrel. This is preferably controlled such that the die slot is heated to a temperature which is lower than that of the barrel in order to better control the extrudate through the nip. It will be realised by those skilled in the art that the polymeric electrode gels used in the present invention typically show hysteresis when heated to melting point and then allowed cool. That is, the temperature at which they melt is higher, typically by some 50° C. or more for eg PVdF/Tetraglyme/Lithium salt gels, than the temperature at which it again becomes a gel. Particularly the modulus of such a gel falls to less than $10^5$ Pa, more particularly less than $10^4$ Pa at some 50° C. or higher more than the temperature at which this modulus is again regained on cooling. This provides for a temperature 'window' in which the electrolyte may be laminated with the electrode material and obtain an optimal bonding.

Preferred methods of the present invention thus heat the electrolyte mixture or gel to a temperature at which the dynamic modulus at 10 Hz is less than $10^5$ Pa, more preferably less than $10^4$ Pa and still more preferably $1 \times 10^3$ Pa or less, compresses it together with the electrode material such that the two form a laminate, and then causes the gel to cool such that the modulus is raised to $10^4$ Pa or more, more preferably $10^5$ Pa or more and still more preferably $10^6$ Pa or more.

As referred to above, in order to allow increased rate of formation of the present laminate the extrudate exiting the die slot is preferably layered onto an electrode which has been wetted with the electrolyte solvent just prior to lamination such that trapped gas is removed and better contact between the gel and electrode is ensured. This is conveniently achieved by applying the solvent onto the electrode at a rate matched to the rate of passage through the nip between the heated rollers. Parameters that need to be matched, readily determined by routine experiment, will be melt temperature, die temperature and slot dimension, roller temperature, distance to first heated roller, nip dimension, extrusion rate (eg. piston or screw) and forward speed of the nip rollers (roller speed), electrode material tension and rate of supply of wetting solvent.

The method of the first aspect may be applied to lamination of electrolyte with one, two or more electrode layers and, optionally, with other layers, such as a support layer. Typical support layers may comprises a material such as Celgard® and preferably Celgard® 2400 (Hoechst Celanese). Such a material is conveniently fed as a web between two extruded tapes of electrolyte which have been heated to the liquid or part liquid (ie. molten contact surface) state, and then passing these together with one or more electrode layers simultaneously or sequentially through a desired nip or nips between two or more rollers.

Where it is desired to produce a component that has only one electrode layer, it is possible to merely pass one such layer through the nip with the electrolyte. However, it may be preferred, as in all methods of this aspect, to pass the materials to be laminated through the nip with one or more backing strips, preferably being easily peelable from the product, Such a backing strip would preferably be wider than any of the layers to be laminated and thus, when the gel had been cooled to regain its near optimal or optimal modulus, would be peeled away using the excess strip as a gripping portion.

It will be realised by those skilled in the art that step (iv) is most conveniently effected by simply allowing the laminate to cool, but may be accelerated by control of the temperature of a zone on which this occurs, eg. by supply of cooling fluid, eg. gas, eg. dry air or nitrogen.

In a second aspect of the present invention there is provided an apparatus for producing a polymeric electrolyte component characterised in that it comprises:

(i) a source of tape of a gelled or gellable mixture comprising a crystallisable polymer and an aprotic organic liquid, the liquid not being a solvent for said polymer at a first temperature but being a solvent for said polymer at some higher temperature, the ratio of the mass of the polymer to the mass of the liquid being from 1:4 to 2:3 and the mixture having a having a bulk ionic conductivity at a first temperature and 10 kHz greater than $10^4$ Siemens per centimetre and a dynamic modulus at a first temperature and 10 Hz greater than $10^4$ Pa, the tape being of desired width and depth;

(ii) a source of electrode material in tape form oriented such as to receive the electrolyte tape on one of its surfaces;

(iii) a nip defined by the gap between two or more roller devices located adjacent the point where the two tapes are contacted and which is capable of compressing these to produce an elongate laminated composite tape of defined thickness; and (iv) a cooling zone in which the extruded laminated is passively or actively cooled.

A preferred apparatus of the second aspect of the invention comprises:

(i) an extruder charged with a mixture of a crystallisable polymer and an aprotic organic liquid, the liquid not being a solvent for said polymer at a first temperature but being a solvent for said polymer at some higher temperature, the ratio of the mass of the polymer to the mass of the liquid being from 1:4 to 2:3 and the solid electrolyte having a having a bulk ionic conductivity at a first temperature and 10 kHz greater than $10^4$ Siemens per centimetre and a dynamic modulus at 10 Hz greater than $10^4$ Pa, the extruder including a heater that maintains the mixture at a temperature at which it is in the liquid phase;

(ii) an extruder die having an orifice of defined shape and dimension which includes a heating apparatus set at a temperature at which the mixture remains in the liquid phase;

(iii) a supply of electrode material positioned below the orifice and oriented such as to receive extruded material from the orifice on at least one of its surfaces;

(iv) a nip defined by the gap between two or more roller devices located adjacent the point where the extruded material and supply of electrode material are contacted which is capable of compressing these to produce an elongate composite of defined thickness; and (v) a cooling zone in which the extruded laminated is passively or actively cooled such that the mixture becomes a solid phase gel.

The apparatus preferably includes a supply of aprotic organic liquid positioned such as be transferred to the surface of the electrolyte and/or electrode material prior to its contact with the electrolyte material. This is conveniently provided as one or more fluid lines leading from a reservoir of the liquid to outlets, at least one outlet being provided to each electrode material supply. Supply of further solvents may also be included at further points in the apparatus, ie. in or downstream of the extruded barrel, prior to the nip liquid feeds or after laminate formation.

It will be realised by those skilled in the art that where two or more electrode material layers are to be incorporated into the composite, these will be associated with appropriate supplies of aprotic organic liquid.

The electrode material is preferably supplied from one or more storage rolls which rotate to supply the nip rollers. The supply to the nip may be via one or more guide rollers and grip rollers. The nip rollers are preferably heated to help in the forming of the composite laminate product.

The extruder is preferably a heated ram extruder or is a heated screw extruder with an associated mixing chamber capable of mixing the crystallisable polymer and the aprotic liquid. The nip is preferably formed between two heated rollers In a third aspect of the present invention there is provided a multilayer composite material comprising a laminated structure including one or more electrode layers and a polymeric electrolyte layer characterised in that the electrolyte is a gel comprising a crystallised polymer and an aprotic organic liquid, the liquid not being a solvent for said polymer at a first temperature, but which is such a solvent at some higher temperature, the ratio of the mass of polymer to the mass of liquid being from 1:4 to 2:3 and the solid electrolyte having a having a bulk ionic conductivity at a first temperature and 10 kHz greater than $10^{-4}$ Siemens per centimetre and a dynamic modulus at 10 Hz greater than $10^4$ Pa at said first temperature.

Preferably the electrolyte has a dynamic modulus at 10 Hz greater than $10^5$ Pa.

Advantageously, said first temperature is 20° C.

The present invention also provides a method of producing a laminated electrical component incorporating a polymeric electrolyte layer and an electrode material layer characterised in that it comprises steps of:

(i) producing a gellable mixture comprising a crystallisable polymer and an aprotic organic liquid, the liquid not being a solvent for said polymer at a first temperature but being a solvent for said polymer at some higher temperature;

(ii) forming the mixture as an elongate tape of desired width and depth;

(iii) contacting the tape from step (ii) with an electrode material at a temperature at which the tape, at least at the contact surface, is in the liquid phase; and (iv) simultaneously or sequentially with step (iii) compressing the electrode material and mixture whereby an elongated laminated composite is formed.

Additionally, the present invention provides a multilayer battery comprising a laminated structure including one or more electrode layers and a polymer electrolyte layer, characterised in that the electrolyte is a gel comprising a crystallisable polymer and an aprotic organic liquid, the liquid not being a solvent for said polymer at a first temperature, but which is such a solvent at some higher temperature.

The present invention will now be more particularly described by way of example with reference to the accompanying drawings, in which:

FIG. 6 illustrates a suitable twin screw extrusion apparatus.

Figure 1:
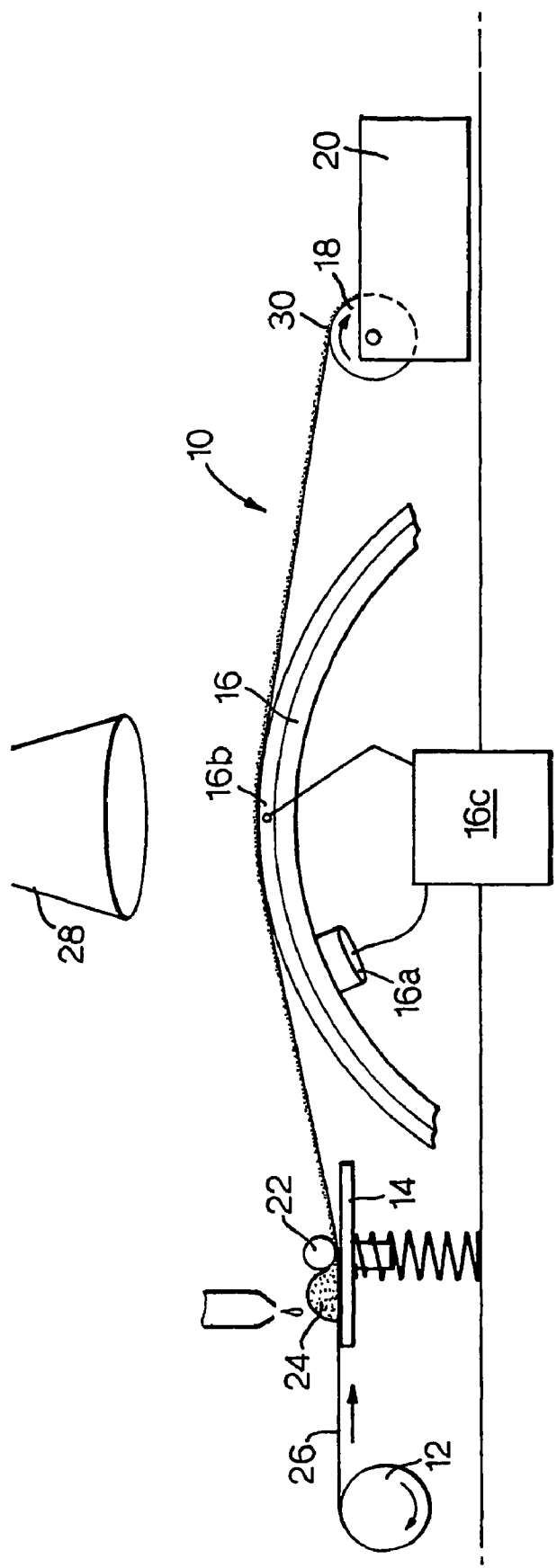
FIG. 1 is a schematic diagram of a foil coating apparatus.

There now follows a description of the inventors preparation and production of various components by way of example to those readers unfamiliar with possible production methods associated therewith. However, those skilled in the art will appreciate commercial components are available and may be used as alternatives.

Electrode Preparation p Commercial electrodes such as those commonly used in lithium ion cells may be employed with the present invention. Alternatively electrodes may be prepared using various established techniques. Typically a slurry mixture is prepared comprising the active electrode material with, optionally, an electronic conductor (eg. conductive carbon black or graphite) together with a binder dissolved in a suitable solvent. Typically suitable binders include polyvinylidenedifluoride (PVdF), ethylenepropylenedienemonomer (EPDM) or polytetrafluoroethylene (PTFE) with a solvent such as cyclopentanone, cyclohexane, dimethylformamide (DMF) or N-methyl-2-pyrrolidone (NMP). The slurry is then coated as a thin film on a suitable metal substrate and the solvent evaporated.

Alternatively the slurry can be prepared using a commercially available conductive ink which contains both the binder and electronic conductive component as described below.

As an alternative to the above, one might cast the electrodes in which case the electrodes may be cast on thin metal foils, (typically 10-25 μm thick, Cu for the anode and Al for the cathode) of loadings of 10-20 mg cm$^{-2}$ active cathode material. The electrode materials need to adhere well to the foils and need to resist the gel solvent to be used at the temperature of the lamination. The anode width at 27 mm is conveniently less than the cathode at 40 mm to ensure that the electrodes are always separated by gel overlap during the extrusion lamination. The foils are carefully wound onto bobbins and placed in a vacuum oven for final drying before loading onto the laminator.

Foil Preparation

The electrode foils and finished electrodes were handled at all times using PVC gloves. Electrode foils were cut to the desired length and width on a cutting mat using scapel and straight edge and flattened with a heavy plastics roller over them and then wound onto the first bobbin. The foil plus bobbin is weighed and loaded onto the electrode coating machine.

Anode Material 1.3 g PVDF (Solvay 1015), dried under vacuum at 100° C. for more than 16 hours, is added to 5 mls cyclopentanone heated to 100° C. over 20 mins while stirring continuously. The solution is filtered to remove undissolved residue. 5.85 g graphite are added to the solution and thoroughly stirred for 20 mins. 9.8 g of Acheson ink are added and the mixture thoroughly stirred for 2 hours. The Acheson ink (Electrodag PR-406) contains approximately 40% solvent and 33% graphite. Following casting and solvent removal, the composition by weight is 10% PVdF, 45% graphite and 45% Acheson ink solids (ie. 10% PVdF, 70% graphite, 20% non-graphitic ink residue).

Cathode Material 1.3 g PVDF (Solvay 1015), dried under vacuum at 100° C. for more than 16 hours, is added to 5 mls cyclopentanone heated to 100° C. over 20 mins while stirring continuously. The solution is filtered to remove undissolved residue. 8 g $LiMn_2O_4$ spinel are added to the solution and thoroughly stirred for 20 mins. 7 g of Acheson ink is added and the mixture thoroughly stirred for 2 hours. Following casting and solvent removal, the composition by weight is 10% PVDF, 60% spinel and 30% Acheson ink solids (ie. 17% graphite, 13% non-graphitic residue)

Foil Coating Apparatus

The foil coating apparatus 10 is shown in FIG. 1 and consists of a loaded feed bobbin 12 feeding the foil over the spring loaded pressure pad 14 across a curved hotplate 16 and pulled via the receiving bobbin 18 attached to a motor 20. An RK Bar 22 is clamped in position over the pressure pad 14 and electrode material 26 is dripped evenly onto the foil just prior to it being fed under the bar 22. The hotplate 16 is provided with a heater 16a, a thermocouple 16b and a Eurotherm temperature controller 16c to control the temperature of plate 16 within desired limits.

Foil Coating Method

The foil is fed from the loaded feed bobbin 12 over the spring loaded pressure pad 14 across the curved hotplate 16 and fixed to the receiving bobbin 18. The RK Bar (Typically No. 8) 22 is clamped in position over the pressure pad 14. The curved hotplate is heated to 125° C. and the driven receiving bobbin 18 set in motion pulling through the foil (speed setting 1 on the motor). Electrode material 24 (sufficient to obtain an even total covering) is dripped evenly onto the foil just prior to it being fed under the RK Bar. At the top of the heater (under a fume extraction hood 28) cyclopentanone is driven off in a controlled slow manner such that the electrode surface wound onto the bobbin 18 is touch dry, adheres to the foil 26 and is not blistered. (the temperature and dwell time on the heater is adjusted to prevent the cyclopentanone from being driven off too quickly which causes blistering).

The electrode 30 is unwound from bobbin 18 and the surface dusted using compressed air, and/or brush or wipe soaked in ethanol to remove any loose particulate material. The electrode 30, rewound onto the bobbin, is annealed in a vacuum oven at 135° C. for 15 minutes to drive off any residual solvent and then weighed enabling a loading to be calculated.

The electrode 30 and bobbin 18 are annealed in a desiccator placed in a vacuum oven at 135° C. for one hour. After one hour, nitrogen is introduced into the evacuated oven and the desiccator tap closed to prevent ingress of water and oxygen. The desiccator with electrodes is introduced into the dry chamber of the extrusion lamination apparatus.

Loadings

From a single electrode casting, loadings range between 3 and 6 mg cm$^{-2}$ for the anode and between 8 and 15 mg cm$^{-2}$ for the cathode, preferred final loadings are 8-10 and 15 to 20 mg cm$^{-2}$ respectively. For a given electrode casting the loadings are even along the length of the foil. The loading is determined by the viscosity of the electrode casting slurry, the foil speed, the RK Bar No. and the pressure of the casting mat under the RK Bar.

Loadings of the active materials are calculated as a percentage of the total loadings. For the above example these are 70% for the anode and 60% for the cathode.

The electrode foils 26 used for a particular lamination are chosen from pre-coated foils according to the loadings of the active materials to give an electrochemically balanced cell or slightly anode deficient. Typical laminate loadings are 10 mg cm$^{-2}$ of $LiMn_2O_4$ spinel on the cathode and 4 mg cm$^{-2}$ of graphite on the anode.

Whilst it will be appreciated that the gel preparation may take any one of a number of approaches, we describe one such process by way of example.

Typical Gel Preparation

In the example of this application the polymer gel electrolyte is prepared in the dry box (better than −75° C. dewpoint, 5 ppm water). Typically, for example, 10 g ethylene carbonate (EC), 30 g tetraglyme (TGm) and 4 g $LiBF_4$ may be added together and stirred at room temperature for at least 3 hours to ensure a homogeneous 1M solution with respect to the salt. 7 g of the filtered (porosity 3 PTFE sinter) 1M solution is added to 3 g PVDF (Solvay 1015) in a glass phial and thoroughly mixed with a glass rod. The phial containing the mixture is de-gassed in a desiccator for at least 20 minutes. The phials, loosely stoppered to prevent escape of solvent vapour are placed in a heater block at 180° C. for 20 minutes until the mixture forms a homogeneous melt. The melt is stirred and allowed to cool to form the gel. During cooling the gel is degassed by applying a light vacuum and then cooled to form candle like pellets that fit exactly into the ram extruder. Six to eight 10 g slugs of gel are generally required for each lamination. The moisture sensitive slugs are placed in a sealed dry container.

The composition of the gel and appropriate melt temperatures can be varied according to solvent, salt and polymer.

Extrusion Lamination Apparatus

Figure 2:
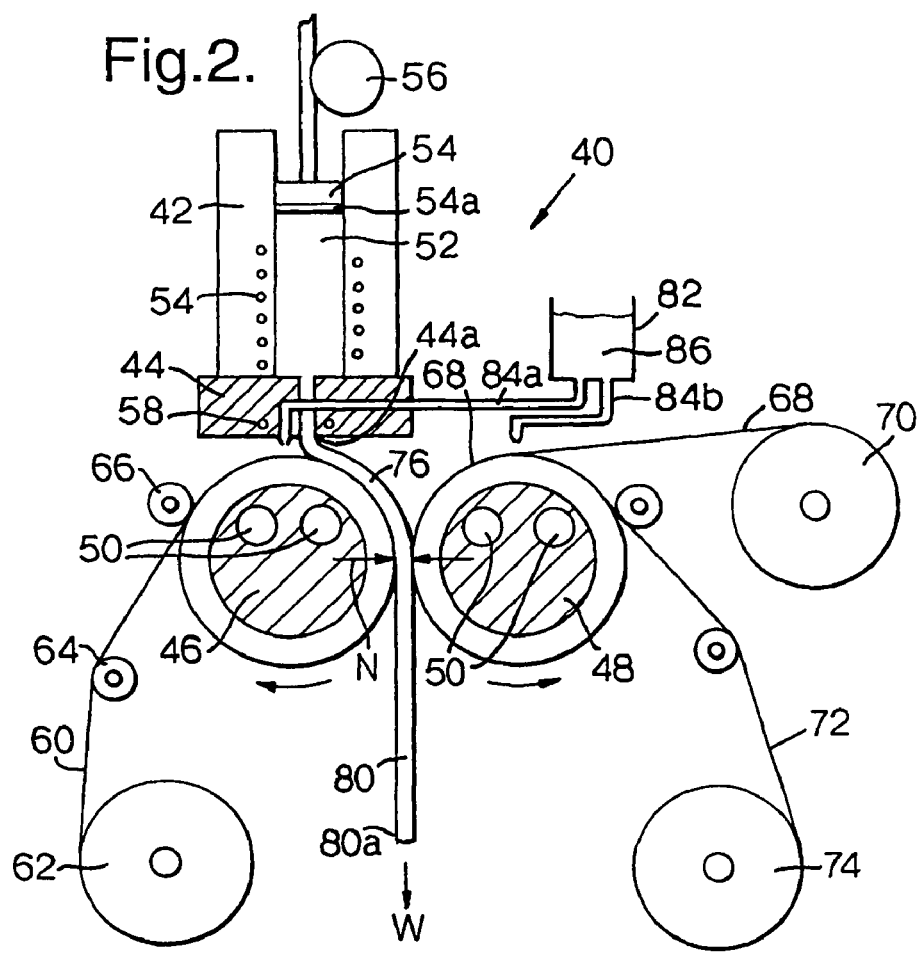
FIG. 2 is a schematic diagram of a lamination apparatus according to one aspect of the present invention.

The present extrusion lamination apparatus 40 is shown in FIG. 2 and consists of a heated ram extruder 42, die 44 and heated lamination rollers 46, 48 having heaters 50 provided therein.

The ram extruder barrel 52 is heated by means of heating coils 54 to the melt temperature of the gel and the rate of extrusion is controlled by a piston 55 driven by a motor 56 at a controlled rate. The piston is of stainless steel with an anti extrusion PTFE face 54a to prevent bleed back. From the ram, the gel passes through the die slot 44a, of predefined width and thickness, heated by heater 58 to a temperature slightly lower than that of the melt. The temperature difference between the die 44 and melt is chosen in order to better control the extrudate through the "nip" between the rollers.

The cathode foil 60 is led from the foil storage roll 60 over a guide roller 64 under a spring loaded foil grip 66 onto the first heated roller 46. The second electrode 68 (anode on copper foil narrower than the cathode) is formed by combining a copper foil 68 from a supply roll 70 with a backing of plain aluminium foil 72 from a supply roller 74. The aluminium foil is 40 mm wide and fed clear from the third storage roller 74 in order to prevent excess gel from clogging the nip rollers 46, 48.

The extruded melt 76 from the die 44 in the form of a thin molten film, layers onto the first electrode 60 on the first heated roller 46 placed very close to the die exit. The anode from storage roll 70 together with the aluminium foil backing strip 72 is brought via the second heated roller 48 to a nip N (defined as the gap between rollers 46, 48) where the whole assembly is laminated together by the compression created with the nip. The final laminate 80 hangs about 1½ m from below the nip into a collection tube (not shown in FIG. 3).

A drip cup 82 with two capillary tubes 84a, 84b applies solvent 86 (possibly that used for making the gel) onto the electrodes 60, 72 immediately prior to lamination to ensure full "prewetting" of the electrode foils and the removal of trapped gas.

Pre Lamination Procedure

Prior to lamination, equipment, components and materials are entered into the dry chamber while it is being purged with nitrogen.

The electrodes 60, 68 on the storage rolls 62, 70 together with the aluminium backing strip 72 are fed onto the heated rollers 46, 48 and through to the nip N. The foil ends 80a are clamped together and a small predefined weight (W) provides tension through the nip. The size of the nip will vary depending on the finished article but a gap of 250 μm has been found to be appropriate for the product outlined herein, The ram barrel, die and heated rollers are set to the required temperature. The ram extrusion rate and roller rate are preset. Solvent liquid is placed ready for entering the drip cups to "prewet" the electrodes.

The die face is cleaned with release spray, dry tissue and the die slot scraped with thin piece of copper exactly fitting the die slot.

Finally the gel is entered into the barrel of the extruder and allowed to reach a stable melt temperature.

The processing parameters, preset to values depending on the composition of the gel, are: Melt temperature; Die temperature; Roller temperature; Die exit to first roller distance; Die slot dimension; Nip dimension; Extrusion rate; Foil tension; Drip feedrate.

Roll speeds of about 1 m/min are typically obtained, but may be varied, eg. 0.1 to 10 msec depending on process conditions.

Typical preset processing parameters are (example values):

| | | |
|---|---|---|
| Melt temperature | 150° C. | |
| Die temperature | 140° C. | |
| Roller temperature | 125° C. | |
| Die exit to first roller distance | 3 mm | |
| Die slot dimension | 250 μm | 40 mm |
| Nip dimension | 0.75 mm | |
| Extrusion rate | ~40 ml/min | |
| Roll speed | ~1 m/min | |
| Foil tension | 117 g | (100 g minimum) |
| "Pre-wet" drip feed rate | ~10 ml/min | |

The ram extruder can be replaced by a twin screw extruder 100 such as shown in FIG. 6 with advantages for continuous manufacture and essential volume production requirements.

Some characteristics of the Twin Compounding Screw system are: low pressure extrusion; throughput independent of screw rpm; short dwell times; very good mixing of powdered polymer, particularly PVdF and solvent and no back leakage of solvent; suitable for feeding our slot die designs and for table mounting to feed extrudate on to heated rolls and electrode foil and nip system.

Extrusion of salted gels will be easier than unsalted due to the increase in viscosity of the mixture caused by the addition of salt.

In the example of FIG. 6 the screw feeder 102 is employed to feed pre-mixed gel components along barrel 104 and force it from defined die outlet 144a at one end thereof. The outlet 144a is as described with reference to FIG. 2, as is the heated roller arrangement which, for brevity, is not repeated in FIG. 6. Of note is the injection arrangement 106 comprising, for example, a reservoir of solvent 108, a peristaltic pump 110 and an injection nozzle 112. In this particular arrangement the injection point is at the beginning of the screw feed but injection may take place at any point along the screw or even at point 114 adjacent the outlet 144a. A further component of FIG. 6 comprises an optional controlled PVdF powder feeder 116 which may be a gravimetric feeder in an industrial scale process.

Figure 3:
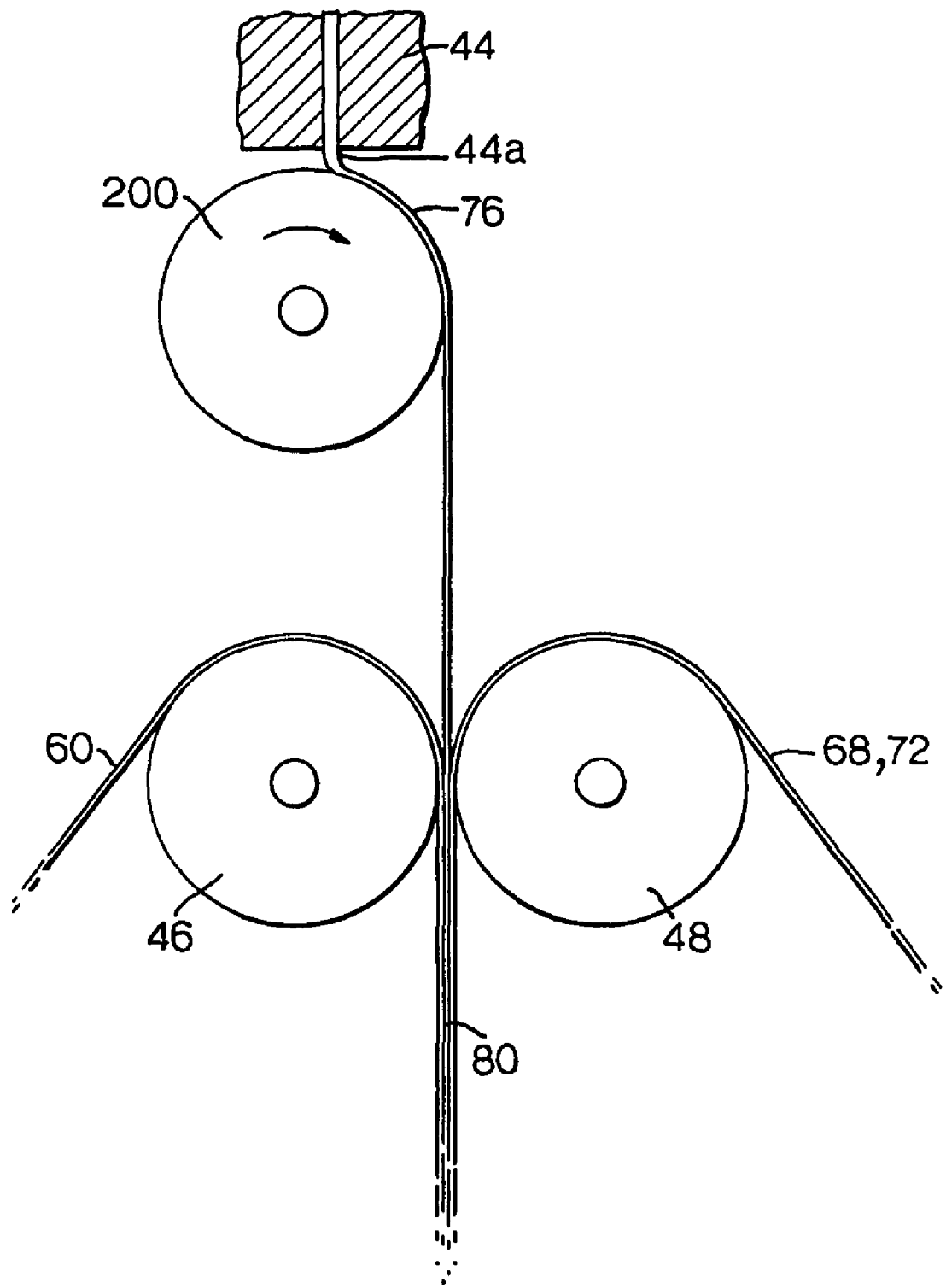
FIG. 3 is a schematic diagram of an alternative form of apparatus and illustrates a chill roller.

Referring now to FIG. 3 which illustrates an arrangement in which hot gel material is extruded in the manner described above but falls onto a chill roller 200 before being directed between two heated rollers 46, 48, the detail of which is as shown in FIG. 2. The rollers are preferably heated to about 140° C., but it will be used depending on the properties of the gel material better control of the gel into the nip.

Figure 4:
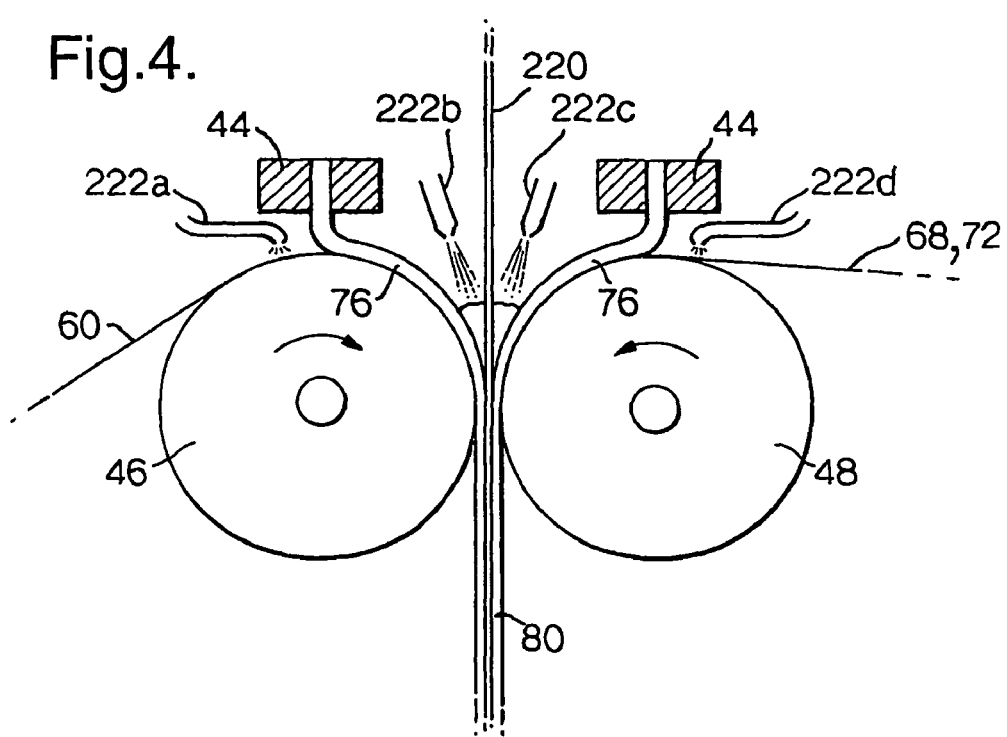
FIG. 4 illustrates an alternative arrangement illustrating the addition of a spacing element.

FIG. 4 illustrates an arrangement in which a web material 220 having open pores (not shown) is inserted between two gel extrusions 76. The web 220 acts to hold the two electrodes apart, and being of non-conductive material, prevents shorting between the electrodes when the electrode length is formed into a finished battery. Whilst all major components of the FIG. 4 arrangement are as shown in FIG. 2 and are, therefore, not repeated, it is worth highlighting feeds 22a-22d, each feed solvent in the manner of feeds 84 in FIG. 2.

As an alternative to the FIG. 4 arrangement one could employ micro pellets of PVdF material of, say, 1001 μm diameter and feed them in between the gel feeds so that they replace the web material 220 in both position and function. It will be appreciated that when either of these arrangements are employed one may also employ a gel which remains somewhat more liquid than previously described as the gel material will not have to perform the task of keeping the electrodes apart.

Figure 5:
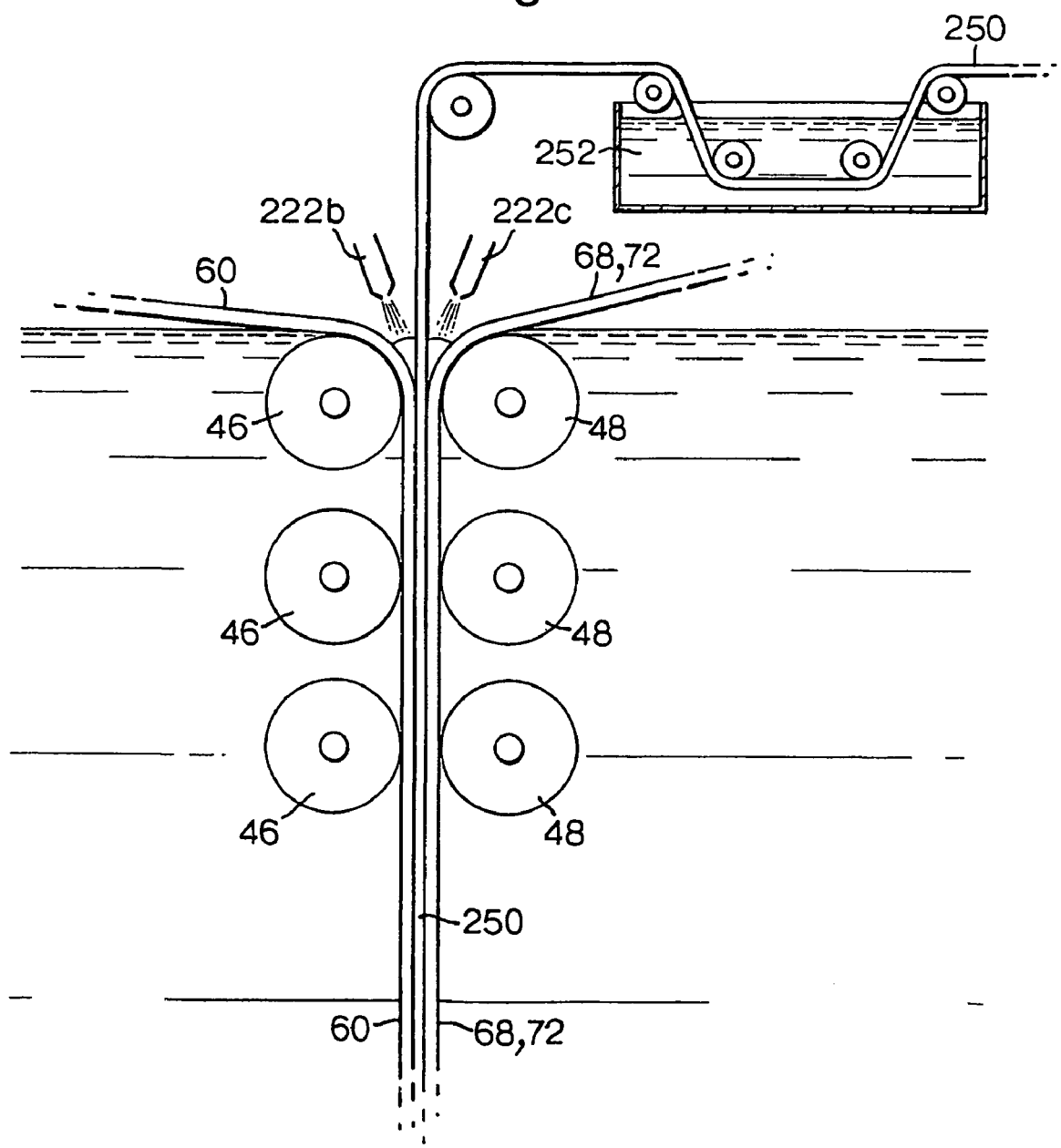
FIG. 5 illustrates a possible arrangement for the production of a component from a cold gel ribbon.

FIG. 5 illustrates a still further arrangement in which components are produced as a cold gel ribbon passed between heated rollers which heat and press the various feeds together. In particular, a cold gel ribbon 250 produced in a previous extrusive process but allowed to cool is optionally fed through a solvent prior to the electrodes 60, 68, 72 being entrained therewith prior to feeding between a plurality of heater rollers 46a-46c, 48a-48c which produce the required heat and nip pressure for ensuring the electrodes bond to the gel 250. The rollers may be heated to different temperatures should this prove desirable.

There now follows a discussion of general trials conducted by the inventors and then a number of specific examples. It will be appreciated these are provided by way of example only.

General Trial

Extrusion trials at APV, Stoke, using an MP19 Series twin-screw extruder with PVDF/PC gel were successful. Continuous gel-tapes (45 mm width×500 um thick) were produced from PVdF powder (Solvay 1015, $M_w$ 240 000, hopper fed) and 70% propylene carbonate (PC) solvent (zone-injected) with total throughput of 1.64 kg/hr (500 g/hr PVDF and 1143 g/hr PC). Small lengths (1-2 m) were collected by winding on a drum by hand.

Microscopic examination showed no difference in gel extruded by the twin-screw from the ram extruder. All samples examined showed complete melting of the polymer and a fine structure seen from our ram extruder samples. No small entrapped air bubbles were found in the extrudate examined by microscopy.

Lamination Procedure

The drip capillaries are primed. The ram extruder is set in motion, initially manually to take up pressure and slack, and then by an electromagnetically activated clutch to drive the extrusion smoothly at a preset rate. The initial extrudate which does not show homogeneous flow is cleared away until there is even extrudate emerging from the die; this is checked visually using a mirror. The nip rollers are activated via a direct drive to gear with a preset electric speed control, and the electrode foil/roller assembly is brought into central position with the extrudate falling exactly into the nip. The drip cups are filled and checked to ensure even flow of the solvent from the capillaries. The assembly is then set to one side with the extrudate layering directly onto the first roller under the die slot.

Extrusion proceeds until the end of the electrode foils and the laminate hangs in one piece from the nip. The process is stopped and the laminate is allowed to cool/gel for a period of typically greater than 10-15 mins.

The laminated foil is carefully cut into lengths, which are taken to the dry box to be bagged, tagged and prepared for electrical tests.

Handling and Packaging

Cutting

Cells may be cut from the laminated strips/tapes which can be of any length. For experimental and developmental purposes the length is typically 60 to 150 mm.

If the anode width is less than the cathode width to ensure overlap of the gel at the edges during lamination, the cathode can be carefully cut close to the width of the anode.

Solvent Exchange

An electrolyte solution consisting of salt and solvent often different from that used to make the gel can be introduced into the cell laminate replacing or complementing the first solvent via solvent exchange. The cell is placed in an excess bath of electrolyte solution consisting of one or more solvents and dissolved lithium salt and gently stirred via a slowly rotating orbital shaker for several hours, often more than 24 hours. Estimates from the diffusivity and cell geometry indicate that more than 80% of the solution is proportionately exchanged within one hour.

Packaging for Laboratory Testing

A disposable cell pouch is made from polyester/polypropylene sheeting of 20 μm thickness heat sealed at the edges in a size appropriate to contain the cell laminate eg. typically 250×80 mm. A rectangular hole 10×45 mm is cut through the pouch and plain aluminium and copper foils larger than the hole are placed on either side inside the pouch over the hole. Conductive adhesive Al and Cu foils are placed either side on the outside of the pouch over the respective inner foils adhering to the inner foils and forming a waterproof seal around the outside of the rectangular hole; one end of these adhesive foils is left free so that connector clips can be attached.

The laminate cell strip is introduced into the pouch so that it is directly between the copper and aluminium foils. Ingots (typically of copper and aluminium of 1 mm thick, but could be of inert rigid material) of dimension less than the rectangular hole are placed either side within the rectangular hole space and a spring loaded plastic clip clamps them and the cell in position providing sufficient pressure contact to ensure electrical connectivity from the laminated current collectors to the external adhesive foils. A long freezer bag clip is attached to the top open edge to seal it or a zip-lock is used. The edge can then be heat sealed outside the dry box.

A low power dc voltmeter is used to check the dc resistance of the cell. This is typically ±0.3 MΩ with both probe configurations. If the resistance is less than about 3 kΩ, the cell may have a short circuit.

Cell Testing

Cells are tested with a typical charge-discharge routine. They can be tested in the dry box or using a Solartron SI 1286 Electrochemical Analyser or outside the dry box using the Bitrode cell testing facility. A typical routine consists of:

Stage 1 Charge At a constant current of eg. 5 mA until the voltage reaches 4.25 V Stage 2 Trickle charge Constant Voltage of 4.25 V until the current falls to 60% of Stage 1 value (eg 3 mA)

Stage 3 Discharge Constant current of eg. −5 mA until voltage reaches 2.5 V

Stage 4 Intermediate Constant Voltage of 2.5 V until the discharge current has fallen to 80% of its Stage 3 value Materials

| | |
|---|---|
| Lithium manganese oxide, $LiMn_2O_4$, spinel Merck Graphite | Aldrich (av grain size 1-2 μm) |
| Electrodag PR-406 | Acheson (conductive ink) |
| polyvinylidene fluoride (PVdF) | Solvay (1015) |
| Cyclopentanone | Aldrich |
| Ethylene carbonate (EC) | Aldrich |
| Propylene carbonate (PC) | Aldrich |
| Tetraglyme (TGm) | Aldrich |
| $LiClO_4$ | Aldrich |
| $LiBF_4$ | Aldrich |
| Copper foil (12 μm) | Nemco |
| Aluminium foil (25 μm) | Moore and Buckle |

In the most fundamental form of the polymeric gel electrolyte material it comprises a polymer, a high boiling point solvent and lithium salt. An example of such is given in the above-mentioned U.S. Pat. Nos. 5,460,903 and 5,639,574.

The present invention will now be further described by way of illustration only by reference to the following non-limiting Figures and Examples. Further embodiments falling within the scope of the invention will occur to those skilled in the art in the light of these.

EXAMPLE 1

Cell made via extrusion lamination using graphite anode and lithiated manganese oxide cathode with PVdF-EC:PC(2:1)-LiClO$_4$ gel. The lamination widths for the electrodes are 40 mm for the cathode and 27 mm for the anode and the laminate strip is 2 m in length.

Electrode Preparation

Anode Material 44 g graphite (Aldrich) are added to 60 mls cyclopentanone in a reaction vessel and stirred for 15 mins. 51.0 g of Acheson ink are added and the mixture thoroughly stirred for more than 4 hours. The slurry is again stirred prior to casting. The Acheson conductive ink (PR-406) contains approximately 40% solvent and 33.3% graphite. Following casting and solvent removal, the composition by weight is 81.5% graphite and 18.5% non-graphitic ink residue.

Cathode Material 56 g LiMn$_2$O$_4$ spinel (Merck) are added to 20 mls cyclopentanone in a reaction vessel and stirred for 15 mins. 33.5 g of Acheson ink are added and the mixture thoroughly stirred for 24 hours. Following casting and solvent removal, the composition by weight is 73.7% LiMn$_2$O$_4$ spinel and 14.6% graphite and 11.7% non-graphitic residue.

Foil Preparation

Copper foil (12 µm thick, Nemco) is cut to a width of 27 mm and 2 m length and wound onto a lead bobbin. Aluminium foil (25 µm, Moore and Buckle) of 40 mm width is cut to 2 m length and wound onto a lead bobbin.

Foil Coating

The foils are coated with their respective electrode materials, copper for the anode and aluminium for the cathode. In each case an RK Bar No. 8 is used, with the curved hotplate at 125° C. and with speed setting 1 on the pull through motor. Each electrode surface was cleaned with a toothbrush soaked in propylene carbonate to remove any loose particulate material. The electrodes, rewound onto the electrode storage roll (diameter 63 mm), were annealed, weighed and then annealed in a vacuum oven at 135° C. for one hour.

Total anode loading was 3.82 mg cm$^{-2}$ giving an active graphite loading of 3.11 mg cm$^{-2}$ Total cathode loading was 11.54 mg cm$^{-2}$ giving an active LiMn$_2$O$_4$ spinel loading of 8.49 Mg cm$^{-2}$.

Gel Preparation

The polymer gel electrolyte is prepared in the dry box (at <−75° C. dewpoint, 5 ppm water).

147 g ethylene carbonate (EC), 73 g propylene carbonate (PC) and 20 g LiClO$_4$ are added together (to give a 1 M solution) and stirred at room temperature for 3 hours. 7 g of the filtered (porosity 3 PTFE sinter) 1M solution is added to 3 g PVDF (Solvay 1015) in a glass phial and thoroughly mixed with a glass rod. This is repeated in six identical phials. The phials containing the mixture are de-gassed in a desiccator for 20 minutes. The phials, loosely stoppered to prevent escape of solvent vapour are placed in a heater block at 150° C. for 15 minutes until the mixtures form homogeneous melts. Each melt is stirred and allowed to cool to form the gel. During cooling the gel is degassed by applying a light vacuum and then cooled to form candle like pellets that fit exactly into the ram extruder. The six 10 g moisture sensitive slugs are placed in a sealed dry container and transferred to the extrusion lamination dry chamber.

Extrusion Lamination

The extrusion lamination procedure is as outlined above. The ram barrel is set at a melt temperature of 150° C., the die at 140° C. and heated rollers at 125° C. The die exit to first roller distance is set at 3 mm, the die slot dimensions are preset at a thickness of 250 µm and width of 40 mm; the nip dimension is 0.75 mm. The roller speeds are set to produce the laminate at 1 m/min. The foil tension is set at 117 g. The drip capillaries are primed with propylene carbonate.

Following lamination the laminate is allowed to cool and gel for 20 mins. The laminate is then carefully cut into lengths and removed to the dry box for packaging and testing.

Handling and Packaging

A cell of length 80 mm is cut from the laminated strip and the cathode width of the cell strip is reduced to 36 mm by cutting 2 mm from each side. The cell is inserted into the prepared plastic pouch, clamped and sealed and removed from the dry box. The dc resistance of the cell is checked at 0.7 and −0.6 MΩ indicating no short circuit; the ac resistance is measured at 12 Ω.

Cell Testing

The cells was tested using a typical charge-discharge routine on the Bitrode cell testing facility. The charging current was 5 mA until the voltage reached 4.25 V maintained until the current fell 3 mA; followed by a discharge current of −5 mA until the voltage reached 2.5 V maintained until the discharge current has fallen 4 mA.

EXAMPLE 2

Cell made via extrusion lamination using graphite anode and lithiated manganese oxide cathode with PVdF-EC:PC(1:1) gel and the salted electrolyte solution is introduced via solvent exchange in a bath of EC:DEE(1:1) LiClO$_4$. The lamination widths for the electrodes are 40 mm for the cathode and 27 mm for the anode and the laminate strip is 2 m in length.

Electrode Preparation

Anode Material 44 g graphite (Aldrich) are added to 60 mls cyclopentanone in a reaction vessel and stirred for 15 mins. 53.6 g of Acheson ink are added and the mixture thoroughly stirred for more than 4 hours. The slurry is again stirred prior to casting. The Acheson conductive ink (PR-406) contains approximately 40% solvent and 33.3% graphite. Following casting and solvent removal, the composition by weight is 81.3% graphite and 18.7% non-graphitic ink residue.

Cathode Material 56 g LiMn$_2$O$_4$ spinel (Merck) are added to 20 mls cyclopentanone in a reaction vessel and stirred for 15 mins. 33.5 g of Acheson ink are added and the mixture thoroughly stirred for 24 hours. Following casting and solvent removal, the composition by weight is 73.7% LiMn$_2$O$_4$ spinel and 14.6% graphite and 11.7% non-graphitic residue).

Foil Preparation

Copper foil (12 µm thick, Nemco) is cut to a width of 27 mm and 2 m length and wound onto a lead bobbin. Aluminium foil (25 μm, Moore and Buckle) of 40 mm width is cut to 2 m length and wound onto a lead bobbin.

Foil Coating

The foils are coated with their respective electrode materials, copper for the anode and aluminium for the cathode. In each case an RK Bar No. 8 is used, with the curved hotplate at 125° C. and with speed setting 1 on the pull through motor. Each electrode surface was cleaned with a toothbrush soaked in propylene carbonate to remove any loose particulate material. The electrodes, rewound onto the electrode storage roll (diameter 63 mm), were annealed, weighed and then dried in a vacuum oven at 100° C. for 50 hours.

Total anode loading was 3.80 mg cm$^{-2}$ giving an active graphite loading of 3.09 mg cm$^{-2}$ Total cathode loading was 12.18 mg cm$^{-2}$ giving an active $LiMn_2O_4$ spinel loading of 8.98 mg cm$^{-2}$.

Gel Preparation

The polymer gel electrolyte is prepared in the dry box (at <−75° C. dewpoint, 5 ppm water).

118.9 g ethylene carbonate (EC), 119.2 g propylene carbonate (PC) are added together and stirred. 7 g of the filtered (porosity 3 PTFE sinter) solution is added to 3 g PVDF (Solvay 1015) in a glass phial and thoroughly mixed with a glass rod. This is repeated in six identical phials. The phials containing the mixture are de-gassed in a desiccator for 20 minutes. The phials, loosely stoppered to prevent escape of solvent vapour are placed in a heater block at 150° C. for 15 minutes until the mixtures form homogeneous melts. Each melt is stirred and allowed to cool to form the gel. During cooling the gel is degassed by applying a light vacuum and then cooled to form candle like pellets that fit exactly into the ram extruder. The six 10 g moisture sensitive slugs are placed in a sealed dry container and transferred to the extrusion lamination dry chamber.

Extrusion Lamination

The extrusion lamination procedure is as outlined above. The ram barrel is set at a melt temperature of 150° C., the die at 140° C. and heated rollers at 125° C. The die exit to first roller distance is set at 3 mm, the die slot dimensions are preset at a thickness of 250 μm and width of 40 mm; the nip dimension is 0.75 mm. The roller speeds are set to produce the laminate at 1 m/min. The foil tension is set at 117 g. The drip capillaries are primed with propylene carbonate.

Following lamination the laminate is allowed to cool and gel for 20 mins. The laminate is then carefully cut into lengths and removed to the dry box for packaging and testing.

Handling, Solvent Exchange and Packaging

A cell of length 95 mm is cut from the laminated strip and the cathode width of the cell strip is reduced to 36 mm by cutting 2 mm from each side. The theoretical cell capacity (anode controlled) is calculated at 20.4 mAh.

An electrolyte solution of 95.1 g ethylene carbonate (EC), 62.9 g diethoxy ethane (DEE) and 16.1 g $LiClO_4$ (1 M solution) are added together and stirred at room temperature for 3 hours.

The laminate strip cell is placed in an excess bath (100 ml) of the EC:DEE-$LiClO_4$ electrolyte solution and gently stirred via a slowly rotating orbital shaker for 1 hour.

The cell is removed from the bath, the current collector foils carefully dried with a cotton bud, and the cell is inserted into the prepared plastic pouch, clamped and sealed. The dc resisance of the cell is checked at 1.9 MΩ and −140 kΩ indicating no short circuit.

Cell Testing

The cells was tested using a typical charge-discharge routine using the Solartron SI 1286 Electrochemical Analyser. The charging current was 2.5 mA until the voltage reached 4.25 V maintained until the current fell 2 mA; followed by a discharge current of −2.5 mA until the voltage reached 2.5 V maintained until the discharge current has fallen 2 mA.

EXAMPLE 3

Cell made via extrusion lamination using commercially produced electrodes with active materials of $LiCoO_2$ cathode and graphite anode with PVdF-TGm:EC(3:1)-$LiBF_4$ polymer gel electrolyte. The lamination widths for the electrodes are 40 mm for the cathode and 27 mm for the anode and the laminate strip is 2 m in length.

Gel Preparation

The polymer gel electrolyte is prepared in the dry box (at <−75° C. dewpoint, 5 ppm water).

30.0 g tetraglyme (TGm), 10.02 g ethylene carbonate (EC) and 4 g $LiBF_4$ are added together and stirred at room temperature for at least 3 hours to ensure a homogeneous 1M solution. 7 g of the filtered (porosity 3 PTFE sinter) 1M solution are added to 3 g PVDF (Solvay 1015) in a glass phial and thoroughly mixed with a glass rod. This is repeated in six identical phials. The phials containing the mixture are de-gassed in a desiccator for 20 minutes. The phials, loosely stoppered to prevent escape of solvent vapour are placed in a heater block at 180° C. for 15 minutes until the mixtures form homogeneous melts. Each melt is stirred and allowed to cool to form the gel. During cooling the gel is degassed by applying a light vacuum and then cooled to form candle like pellets that fit exactly into the ram extruder. The six 10 g moisture sensitive slugs are placed in a sealed dry container and transferred to the extrusion lamination dry chamber.

Extrusion Lamination

The extrusion lamination procedure is as outlined above. For this materials composition and combination, the ram barrel is set at a melt temperature of 150° C, the die at 150° C. and heated rollers at 130° C. The die exit to first roller distance is set at 3 mm, the die slot dimensions are preset at a thickness of 250 μm and width of 40 mm; the nip dimension is 0.75 mm. The roller speeds are set to produce the laminate at 1 m/min. The foil tension is set at 117 g. The drip capillaries are primed with tetraglyme/ethylene carbonate, TGm:EC(3:1).

Following lamination the laminate is allowed to cool and gel for 20 mins. The laminate is then carefully cut into lengths and removed to the dry box for packaging and testing.

Handling, Solvent Exchange and Packaging

A cell of length 80 mm is cut from the laminated strip. The theoretical cell capacity (anode controlled) is calculated at 33.9 mAh.

Because the Polystor electrodes are double sided, the copper and aluminium current collecting surfaces are exposed by pipetting a small volume of NMP onto the desired area and leaving for a few minutes. The electrode surface is removed gently by rubbing with a paper tissue and cotton bud. The cell is then inserted into the prepared plastic pouch, clamped and sealed. The dc resistance of the cell was checked at 0.53 MΩ and −0.47 MΩ indicating no short circuit; the ac resistance is measured at 6.6 Ω.

Cell Testing

The cells was tested using a typical charge-discharge routine using the Solartron SI 1286 Electrochemical Analyser. The charging current was 5 mA until the voltage reached 4.2

V maintained until the current fell 3 mA; followed by a discharge current of −5 mA until the voltage reached 2.8 V maintained until the discharge current had fallen 4 mA.

Both APV (eg. MP19 Series) and Prism (eg. the PRISM 16 mm Twin Screw Extruder) have been identified as producing twin-screw compounding extruders suitable for eventual scale-up/continuous operation; these would be directly adaptable to the extrusion lamination test rig.

EXAMPLE 4

Lamination of Cold Gel Ribbons

Lamination of the polymer gel electrolyte between precast electrode foils can also take place using preformed cold polymer gel electrolyte ribbon of predefined thickness. For a PVDF-PC gel the nip roller is at a preferred temperature of about 135-140° C. Several such nip rollers can be used in series at various nip temperatures (eg. a series of rollers at increasing temperatures the decreasing temperatures) to ensure complete lamination and enmeshing of the gel with the electrode materials. "Pre-wetting" of the electrode foils as defined in the extrusion lamination process would ensure the removal of trapped gas in the electrodes.

In an extension of this method the preformed cold polymer gel electrolyte ribbon could be made as an unsalted gel (eg PVDF-PC) and passed through a solvent exchange bath consisting of the same or different solvent or combination plus dissolved salt just prior to the lamination.

Pre-made extruded gel tape was placed between electrode foils and fed into the heated roll nip at 1,/min and at various temperatures. At 135-140° C. the foils and gel were bonded well and the gel tape retained the original dimensions. Above this temperature there was evidence of complete melting and the gel was squeezed sideways and upwards above the nip. These results may provide an alternative layout of the process below the extrusion die as shown in FIG. 2. This arrangement of a chill roll followed by the heated nip rolls as before has process advantages from the point of view of start up and process control. A disadvantage may be inadequate penetration of the gel into the electrode material. It may only bond to the surface layer.

Lamination trials of cold gel ribbons between coated foils using heated rollers were successfully completed. Good results (controlled width of the gel and good adhesion) are achievable, and optimum temperatures for obtaining good adhesion without completely melting the gel and changing the dimensions are about 135-140° C. These results may provide an alternative layout of the process below the extrusion die and would include a chilled roll after the extruder and before the heated rollers.

EXAMPLE 5

The extrusion lamination process provides an even laminate of defined polymer gel electrolyte thickness. The thickness of the laminate is defined by the nip width and relies on the pressure of the molten gel to control and maintain the polymer gel electrolyte thickness. It is possible that there will be a limit at which the thickness of the gel electrolyte will be reduced to zero in places, the electrodes will touch and the cell short. These limits to tolerance arise both from the lamination at the nip and from the evenness of the electrode surface in fabrication and due to the grain size of the active electrode ingredients.

As a fail safe for very thin polymer gel electrolyte developments, two remedies are proposed:

(i) The injection of PVDF microballs of predefined thickness (eg. 80 um diameter) into the final stage of the gel extrusion. The diameter and density with respect to the gel of these microballs to be determined by experiment, will depend on the gel electrolyte thickness to be attained and the nature and quality of the electrodes. The balls could be injected at a suitable point along the barrel of the twin screw extruder or just prior to the die at the lower temperature thereby preventing full melting of the pellets. Being of PVDF they act as precipitation centres and the gel would be able to graft onto them. Alternatively the microballs could be dispersed in the pre-wetting solution of the electrode foils.

(ii) The insertion of a web mesh between the two gel laminates during lamination using a third roller (see figure). The web mesh made particularly from eg. PVdF or a copolymer thereof, would enable the gel to graft on to it providing a robust integrated laminate. A further extension is to use two extruderers with each electrode acting as a chill roller on either side of the web with the lamination in the nip enmeshing both gels together. If the laminate is to be subsequently folded or cut at predefined points along the laminate, the web mesh can be tailored to define an insulating point at which these occur.

The invention claimed is:

1. A method of producing a laminated electrical component incorporating a polymeric electrolyte layer and an electrode material layer comprising the steps of:
   (i) producing a gelable mixture comprising a crystallisable polymer and an aprotic organic liquid, the liquid not being a solvent for said polymer at a first temperature of 20° C. but being a solvent above 20° C., the ratio of the mass of the polymer to the mass of the liquid being from 1:4 to 2:3 and the mixture having a bulk ionic conductivity at said first temperature and 39 kHz greater than $10^{-4}$ Siemens per centimeter and a dynamic modulus at said first temperature and 10 Hz greater than $10^4$ Pa;
   (ii) extruding the mixture through an orifice of defined shape and dimension at a temperature at which it is in the form of a homogenous liquid phase;
   (iii) contacting the extruded mixture in the liquid phase with an electrode material layer to produce a laminated composite comprising electrode and mixture layers;
   (iv) compressing the laminated composite formed in (iii) while the mixture is still in the liquid phase by passing the electrode material and mixture through a nip formed between two or more heated rollers whereby an elongate laminated composite of defined thickness is produced;
   (v) dripping a solvent onto the electrode material at rate matched to the rate of passage through said nip; and
   (vi) causing the laminate to cool such that the mixture is converted to a solid gel.

2. A method as claimed in claim 1 and in which prior to contact of the mixture with the electrode material, an aprotic organic liquid is applied to one or more of the surfaces to be contacted.

3. A method as claimed in claim 1, in which the aprotic organic liquid is applied to the mixture and/or the electrode surface just prior to the compressing step.

4. A method as claimed in claim 1, in which the liquid includes a solvent selected from the group consisting of diethylcarbonate, 1,3-dioxolane, dimethylcarbonate, 1,2-dimethoxyetholane, dimethoxymethane, 1,3-dimethoxypropane ethylmethyl carbonate, 1,2-diethoxyethane, and dichloroethane.

5. A method as claimed in claim 4, in which the solvent or salts are added into the product at any stage after step (ii).

6. A method as claimed in claim 4, and in which where solvent or salts are added at the point of contact of the gel and the electrode and they are supplied at a weight for weight ratio of from 0.01:1 to 1:1 relative to the gel.

7. A method as claimed in claim 1 in which the crystallisable polymer is selected from the group consisting of a crystallisable polyhalo-olefin and a copolymer thereof.

8. A method as claimed in claim 1 in which the aprotic liquid used to prepare the electrolyte mixture comprises one or more organic compounds selected from the group consisting of one or more of monovalent type $-BF_4$, $-PF_6$, $-AsF_6$, $-CF_3SO_3$, $LiN(CF_3SO_2)_2$, $LIN(CF_3CF_2SO_2)_2$, $LiC(CF_3SO_2)_3$, $-CF_3COO$, $SCN$, $-ClO_4$, and $-HgI_3$.

9. A method as claimed in claim 1 in which the mixture further includes one or more alkali or alkaline earth metal salts.

10. A method as claimed in claim 9 in which the alkali metal salt is a lithium salt.

11. A method as claimed in claim 1 including a salt which salt is an anion.

12. A method as claimed in claim 11 in which the anion is monovalent.

13. A method as claimed in claim 9, in which the metal salts are present at a concentration of 2% by mass or more based upon the weight of the organic aprotic liquid.

14. A method as claimed in claim 1 in which the mixture is formed as a solid gel on cooling of the extruded material, that gel having a bulk ionic conductivity of greater than $10^{-4}$ Siemens per centimeter and a dynamic modulus greater than $10^4$ Pa at 20° C.

15. A method as claimed in claim 1 in which the mixture is degassed prior to contact with the electrode material.

16. A method as claimed in claim 1 in which the electrode includes a metal foil or open mesh gauze.

17. A method as claimed in claim 16 which the foil is loaded with active electrode material.

18. A method as claimed in claim 1 in which the electrode is an anode comprising a copper foil loaded with a carbonaceous material and/or a cathode which is an aluminum foil loaded with a material selected from the group consisting of a lithiated manganese oxide material and a lithiated cobalt oxide based material.

19. A method as claimed in claim 1 wherein the component comprises both an anode and a cathode.

20. A method as claimed in claim 1 in which the electrodes are of less width than the gel.

21. A method as claimed in claim 16 further comprising a second foil, wherein the width of the second foil is less than that of the foil.

22. A method as claimed in claim 1 and in which a salt is added to the resultant gel or gelling mixture after extrusion by a process which contacts the composite produced from step (iii) or (iv) with an aprotic solvent solution including the said salt or salts.

23. A method as claimed in claim 1, and employing a process of solvent exchange whereby the extruded gel/electrode composite is contacted with a compatible solvent, which contains the salt which is desired to be added to the composite.

24. A method as claimed in claim 1 in which the polymeric electrolyte mixture is prepared prior to use and produced in particulate gelled form.

25. A method as claimed in claim 1 in which the gelable mixture is formed by premixing components in a dry environment, heating this to form a homogeneous melt, cooling the melt to form a gel while degassing under reduced pressure and then shaping the gel into pellets.

26. A method as claimed in claim 1 in which the gelable mixture comprises particulate or pelletted gel and is loaded into the barrel of a ram extruder, the barrel heated to the melt temperature of the gel and the extrusion effected first, by advancing the extruder piston to void gases, then advancing it further at a desired controlled rate such that the melt extrudes through the extruder die.

27. A method as claimed in claim 1 including the step of passing the gelable mixture through a slot die, to produce a strip thereof.

28. A method as claimed in claim 1 including the step of producing a continuous strip of set width and depth.

29. A method as claimed in claim 1 in which heat is applied to heat the mixture to a temperature at which the dynamic modulus at 10Hz is less than $10^4$Pa compresses it together with the electrode material such that the two form a laminate, and then causes the gel to cool such that the modulus is raised to $10^4$ Pa.

30. A method as claimed in claim 1 when applied to a lamination of electrolyte with two or more layers.

31. A method as claimed in claim 1 and including a support material and, in which the support material is fed as a web between two extruded tapes of gelable material which have been heated to the liquid or part liquid state, and then passing these together with one or more electrode layers simultaneously or sequentially through a desired nip or nips between two or more rollers.

32. A method as claimed in claim 1 when used to produce a component that has only one electrode layer, the additional step of passing one such layer through said nip.

33. A method as claimed in claim 1 when used to produce a component that has only one electrode layer, the further step of passing said layer to be laminated through said nip with one or more backing strips.

34. A method as claimed in claim 1 including the step of accelerating the cooling in step (vi) by control of the temperature of a zone in which this occurs.

35. A method as claimed in claim 1 in which the crystalisable polymer comprises polyvinylidene fluoride (PVdF) or a copolymer thereof.

36. A method as claimed in claim 9 in which the metal salts are present at a concentration of between 15% and 20% by mass.

* * * * *